United States Patent [19]
Cailloux

[11] 3,898,902
[45] Aug. 12, 1975

[54] ROCKING ACTION SHEARING APPARATUS WITH CLAMPING MEANS

[75] Inventor: Paul Cailloux, Le Perreux, France

[73] Assignee: Promecam Sisson-Lehmann, Saint-Denis, France

[22] Filed: Jan. 30, 1975

[21] Appl. No.: 545,592

[30] Foreign Application Priority Data
Feb. 7, 1974 France .............................. 74.4062

[52] U.S. Cl. ...................... 83/378; 83/383; 83/602; 83/611
[51] Int. Cl.² B23D 31/00; B23D 33/02; B26D 7/04
[58] Field of Search ............ 83/378, 383, 385, 602, 83/611

[56] References Cited
UNITED STATES PATENTS
| | | | |
|---|---|---|---|
| 851,413 | 4/1907 | Golding ................................ | 83/378 |
| 1,952,961 | 3/1934 | Yates .................................... | 83/611 |
| 2,122,186 | 6/1938 | Southworth ......................... | 83/378 |
| 2,130,473 | 9/1938 | Ruau .................................... | 83/611 X |

Primary Examiner—Frank T. Yost
Attorney, Agent, or Firm—Michael S. Striker

[57] ABSTRACT

A shearing apparatus for shearing metal plates or the like includes a support frame on which a stationary blade is mounted to engage a plate to be sheared on one side. The other side of the plate is engaged during the shearing operation by clamping means mounted on the support frame for rocking movement about a first axis between an inactive and a clamping position, and movable blade means are mounted on the clamping means for rocking movement about a second axis transversely spaced from the first axis and moved by appropriate means connected thereto between an inactive and a shearing position to move thereby also the clamping means to the clamping position.

10 Claims, 5 Drawing Figures

ROCKING ACTION SHEARING APPARATUS WITH CLAMPING MEANS

BACKGROUND OF THE INVENTION

The present invention relates to shearing apparatus or plate shears.

Generally plate shears comprise a frame structure supporting a fixed horizontally extending blade and a movable apron supporting a second blade inclined at a predetermined angle to the first blade. Thus, when the movable blade is moved towards the fixed blade, it cuts a plate or sheet-metal piece arranged therebetween by starting at one edge and ending at the opposite edge of the plate or sheet. During this cutting action the plate to be sheared must be held firmly against the fixed blade to prevent the plate from tilting or slipping under the combined action of the cutting force and torque exerted thereagainst. Evidently, the greater the cutting stress, the greater the plate clamping force should be.

However, the clamping members provided on shearing apparatus of this type, so far known in the art, are not capable of exerting a clamping force which is proportional to the cutting stress.

Furthermore, shearing apparatus according to the prior art are so designed that the necessary cutting clearance between successive points where the two blades cross each other, which clearance must vary as a function of the thickness of the plate to be sheared and also according to the shear resistance of the plate material, must be adjusted manually.

SUMMARY OF THE INVENTION

It is an object of the present invention to provide a shearing apparatus for shearing metal plates or the like, which avoids the disadvantages of such shearing apparatus known in the art.

It is a further object of the present invention to provide a shearing apparatus which is constructed of relatively few and simple parts to stand up properly under extended use and in which some of the necessary adjustments of the apparatus are performed automatically to thus facilitate operation of the apparatus.

With these and other objects in view, which will become apparent as the description proceeds, the shearing apparatus according to the present invention mainly comprises support means adapted to support a plate to be sheared and a stationary blade fixed to the support means and arranged to be located on one side of a plate supported on the support means. The apparatus further includes clamping means mounted on the support means for rocking movement about a first axis between an inactive and a clamping position in which it clampingly engages the plate to be sheared on the other side thereof, and movable blade means comprising a second blade which includes an angle with the fixed blade. The movable blade means are mounted on the clamping means for rocking movement about a second axis transversely spaced from the first axis between an inactive position and a shearing position in which the second blade engages the plate on said support means on the other side thereof and cooperates with the fixed blade to shear the plate. The movable blade means are moved by means connected thereto between the positions thereof and during movement of the movable blade means from the inactive to the shearing position the clamping means are also moved from the inactive to the clamping position.

In this construction the clearance existing at the points of mutual crossing of the movable blade with the fixed blade will be proportional to the thickness of the plate or sheet metal pressed by the clamping means against the support means. This arrangement will also assure that during the movement of the movable blade means to the shearing position, the clamping means will exert a clamping force proportional to the cutting force.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
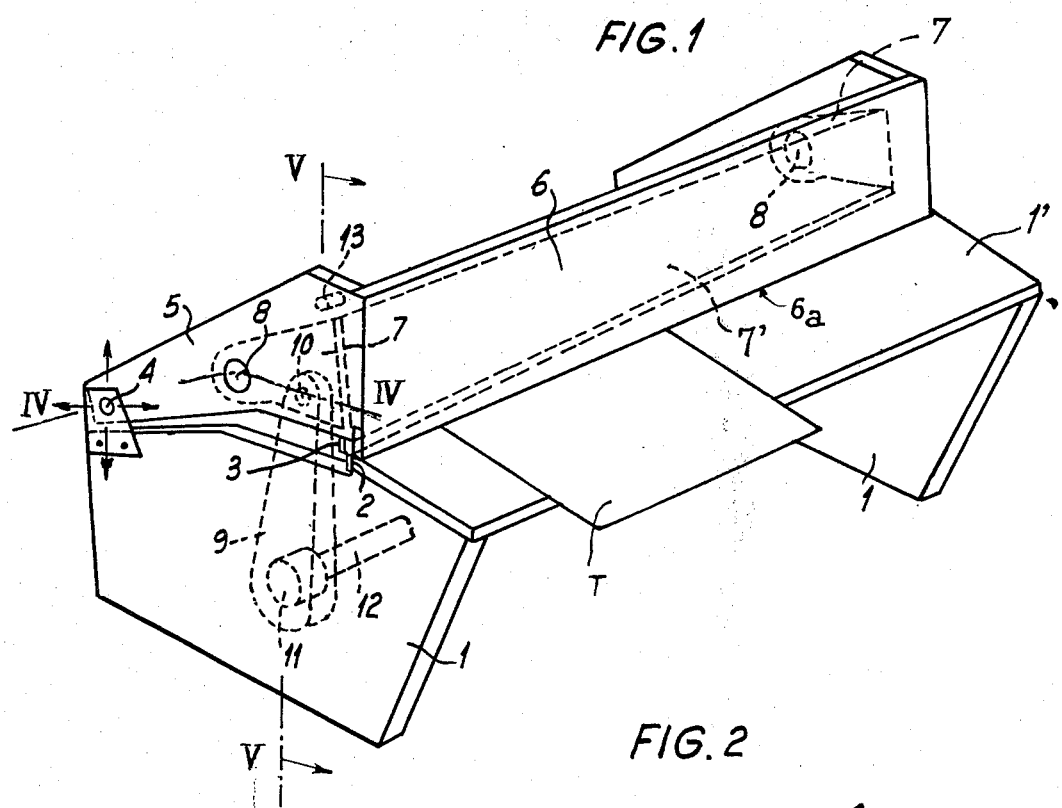
FIG. 1 is a schematic perspective view of the shearing apparatus according to the present invention.

Referring now to the drawing, and more specifically to FIG. 1 of the same, it will be seen that the shearing apparatus according to the present invention comprises support means which include a pair of substantially vertically extending plates 1 which are spaced transversely from each other and a substantially horizontally arranged plate 1' extending between and being fixed in any convenient manner to front portions of upper edges of the vertical plates 1. The horizontal plate 1' carries along the rear edge thereof a stationary blade 2 fixed thereto in any convenient manner and extending along the rear edge of plate 1'. The apparatus includes further clamping means comprising a pair of substantially parallel side plates 5 and a front plate 6 extending transversely between front edges of the side plates 5 and being fixed thereto in any convenient manner. The side plates 5 are mounted in the region of one of the ends thereof on bearings 4, only the left one is visible in FIG. 1, which are aligned along a common horizontal axis. Thus, the clamping means 5, 6 are mounted on the support means for rocking movement about a first axis, that is the axis of the bearings 4, between an inactive position and an active position in which the front plate 6 engages with a bottom face thereof a plate T to be sheared, located on the horizontal plate 1' of the support means. The apparatus includes further movable blade means comprising a pair of arms 7 laterally spaced from each other and substantially parallel to the side plates 5 and a plate 7' extending between and being fixed, in any convenient manner, to front edges of the pair of arms 7. The arms 7 are mounted on pivot means 8 provided on the side plates 5 for a rocking movement about a second axis, that is the axis of the pair of pivot means 8, between an inactive position and a shearing position. The transverse plate 7' carries along the bottom edge thereof the movable blade 3 the cutting edge of which includes, in a vertical plane, a predetermined angle with the cutting edge of the fixed blade 2.

The means for moving the movable blade means 7, 7' and 3 between the inactive and the shearing position thereof may comprise an eccentric 10 driven over a shaft 12 from a prime mover, not shown in the drawing, and a connecting rod 9 surrounding at the lower end thereof the eccentric 11 and pivotally connected at the upper end at 10 to one of the arms 7 of the movable blade means. Preferably, the shaft 12 is provided with two eccentrics and two connecting rods are respectively connected to the eccentrics and to the arms 7 of the movable blade means, respectively. Of course, other means may also be provided to move the movable blade means between the positions thereof, and such other means may comprise, for instance, hydraulic or pneumatic cylinder and piston means connected at one end to the plates 1 of the support means and at the other end to the movable blade means spaced from the pivot means 8 thereof.

As evident from the above description, during the movement of the movable blade means 7, 7', 3 from the inactive to the shearing position, the clamping means 5, 6 will also be moved from its inactive to its clamping position so that the bottom face of the transverse plate 6 of the clamping means will clampingly engage the upper surface of a plate T to be sheared and resting on the horizontal plate 1' of the support means. At least one, and preferably two, pins 13 respectively extending inwardly from the side plates 5 of the clamping means and located in the path of the arms 7 of the movable blade means during the movement thereof from the shearing to the inactive position, will assure that during such movement the clamping means 5, 6 will also be moved to its inactive position.

It is further pointed out that the clamping force applied by the clamping means 5, 6 on the upper surface of the plate T during the shearing action will be proportional to the force exerted by the movable blade 3 during the shearing action.

Figure 2:
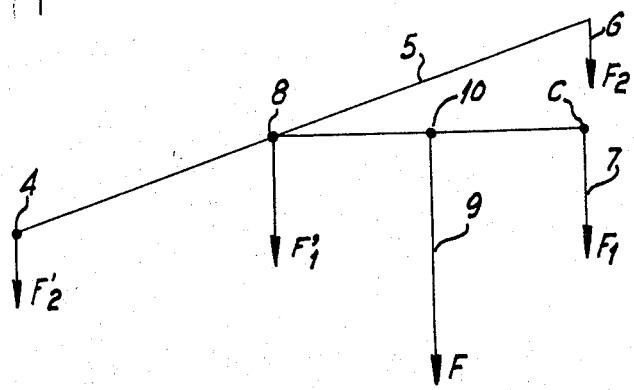
FIG. 2 is a diagram illustrating the various forces occurring during the operation of the apparatus.

This will be evident from the force diagram shown in FIG. 2. The torque transmitted by the force F to the movable blade means by the connecting rods 9 will create a cutting force $F_1$ imparted to the movable blade 3 carried by the transverse plate 7', and a force $F'_1$ which is applied to the side plates 5 of the clamping means. The force $F'_1$ will thus produce a clamping force $F_2$ which is proportional to the cutting force $F_1$. This constitutes an important feature of the present invention since the clamping force advantageously increases corresponding to an increase of the necessary cutting force.

Another advantageous feature of the shearing apparatus of the present invention is that the position of the second axis, that is the axis of the pivot means 8 for the arms 7 of the movable blade means, is arranged according to the thickness of the plate or sheet metal piece T to be sheared. This feature is obtained due to the fact that the pivot means 8 are carried by the side plates 5 of the clamping means 5, 6, instead of on the fixed frame structure of the machine as in conventional constructions. This advantage is evidenced from the diagram of FIG. 3. From this Figure it will be seen that the magnitude of the clearance obtained at successive points of crossing between the fixed and movable blades 2 and 3 is constantly proportional to the thickness of the plate or metal sheet piece T to be sheared. This advantage is also derived due to the fact that the pivot means 8 are carried on the side plates 5 of the clamping means, instead of on the fixed frame structure of the machine as in conventional constructions.

Figure 3:
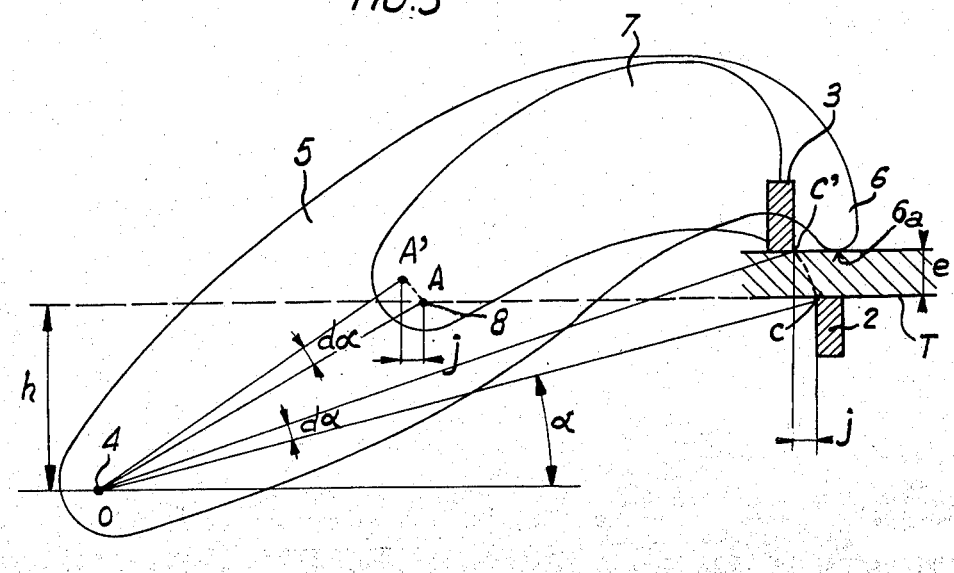
FIG. 3 is a schematic side view illustrating the advantages derivable from the shearing apparatus of the present invention.
Figure 4:
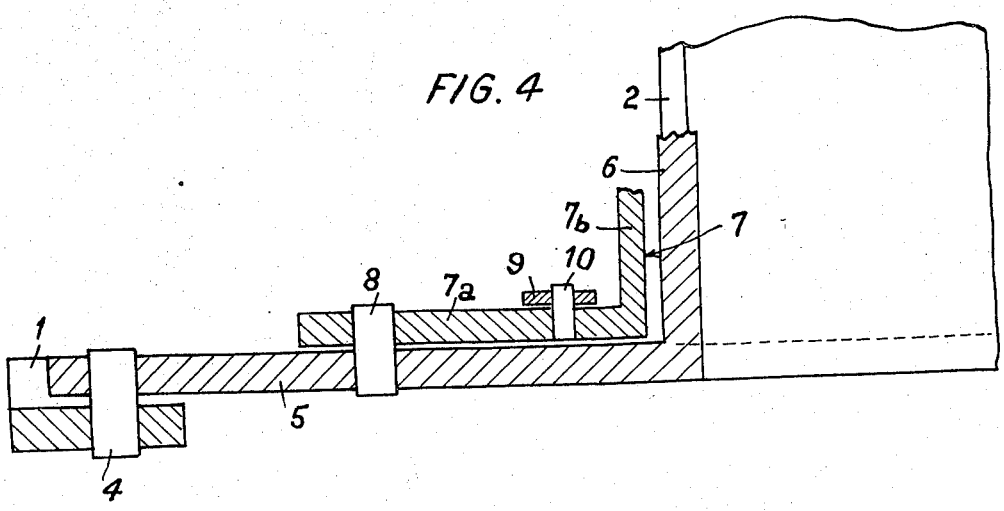
FIG. 4 is a cross section taken along the lines IV—IV of FIG. 1.
Figure 5:
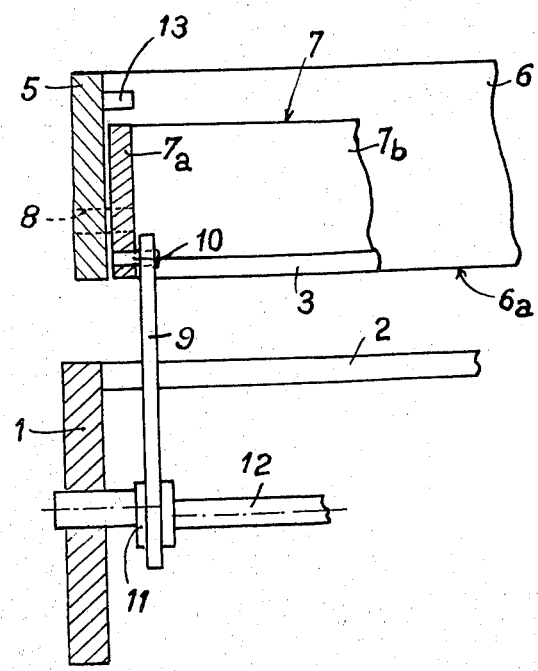
FIG. 5 is a cross section taken along lines V—V of FIG. 1.

This advantage is evident from the diagram of FIG. 3. From this Figure it will be evident that the magnitude of clearance obtained at successive points of crossing between the fixed and movable blades 2 and 3 is constantly proportional to the thickness e of the plate or sheet-metal piece T.

In the cutting position illustrated diagrammatically in FIG. 3, the cutting edge of the movable blade 3 is at point C', located on a circular arc of which the center O is coincident with that of shaft 4 with a radius OC, equal to the distance between the center O and the cutting edge C of the fixed blade. In the same position the pivot means 8 are located at a point A' of a circular arc having its center at O and a radius OA equal to the distance between the center O and the pivot means 8.

In this respect, it may be mentioned that if the cutting edge of the movable blade 3 were located at point C and thus the axis of the pivot means 8 at point A, this would correspond to a zero plate thickness.

The horizontal component of C'C corresponds to the cutting clearance $j$. A simple calculation will prove that this dimension is equal to the horizontal component of AA' when point A lies in the horizontal plane containing the cutting edge C of the stationary blade, that is $$j = e \cdot \text{tangent } \alpha$$

If the point A is not exactly located in the aforementioned horizontal plane, but only in the neighborhood thereof, the above formula would be applicable only approximative.

With this arrangement, the clearance measured across the blades is caused automatically to be proportional to the thickness of the plate to be sheared.

However, it is advantageous to change the cutting clearance as a function of the hardness of the material to be cut. It is pointed out that the harder the material is to be cut, the smaller should the cutting clearance be.

To modify the cutting clearance it is only necessary to vary the value of the angle $\alpha$. For this purpose, the bearing supporting the transverse shaft 4 of the clamping means 5, 6 may be mounted on suitable well-known means, not forming part of the present invention, to permit adjustment thereof in the vertical and/or horizontal direction as indicated by the double arrows in FIG. 1. With this arrangement it is possible to shift the center O and consequently to vary the value of the angle $\alpha$.

It will be understood that each of the elements described above, or two or more together, may also find a useful application in other types of shearing apparatus differing from the types described above.

While the invention has been illustrated and described as embodied in a shearing apparatus comprising clamping means rockably mounted on support means and movable blade means rockably mounted on the clamping means, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rocking action shearing apparatus for shearing metal plates or the like, comprising support means adapted to support a plate to be sheared; a stationary blade fixed to said support means and arranged to be located on one side of a plate supported on said support means; clamping means mounted on said support means for rocking movement about a first fixed axis between an inactive position and a clamping position in which it clampingly engages the plate on the other side thereof; movable blade means comprising a second blade having a cutting edge which includes in a vertical plane an angle with the cutting edge of said stationary blade, said movable blade means being mounted on said clamping means for rocking movement about a second axis transversely spaced from said first axis between an inactive position and a shearing position in which said second blade engages a plate on said support means on the other side thereof and cooperates with said fixed blade to shear the plate; and means connected to said movable blade means for moving the latter between the positions thereof and said clamping means from said inactive to said clamping position.

2. A shearing apparatus as defined in claim 1, wherein said clamping means comprise a pair of spaced side plates, each mounted in the region of one of the ends thereof on said support means for rocking movement about said first axis and a front plate extending between the other ends of said side plates fixedly connected thereto and having a bottom face engaging in said clamping position the other side of the plate to be sheared.

3. A shearing apparatus as defined in claim 2, wherein said movable blade means comprise a pair of arms substantially parallel to said side plates, each mounted in the region of one of the ends thereof on said side plates for rocking movement about said second axis, said second blade extending between and being fixed to the other ends of said arms.

4. A shearing apparatus as defined in claim 1, wherein said first and said second axes extend in substantially horizontal direction.

5. A shearing apparatus as defined in claim 1, wherein said cutting edge of said stationary blade extends in substantially horizontal direction, and wherein said second axis is located in close proximity of a horizontal plane which includes the cutting edge of said stationary blade.

6. A shearing apparatus as defined in claim 5, wherein said clamping means is mounted on bearings aligned along said first axis, said bearings being mounted on said support means adjustable in at least one direction relative thereto.

7. A shearing apparatus as defined in claim 6, wherein said bearings are adjustable in vertical and horizontal direction relative to said support means.

8. A shearing apparatus as defined in claim 1, and including means on said clamping means engaged by said movable blade means during movement of the latter from said cutting to said inactive position to move said clamping means from said clamping to said inactive position.

9. A shearing apparatus as defined in claim 1, wherein said support means comprise two transversely spaced substantially vertical plates and a substantially horizontal plate extending between and fixed to said vertical plates for supporting on said horizontal plate a metal plate or the like to be sheared.

10. A shearing apparatus as defined in claim 3, wherein said moving means comprise at least one eccentric and a connecting rod between said eccentric and one of said arms of said movable blade means.

* * * * *